May 1, 1951 F. KESSLER 2,550,820
AUTOMATIC LINE TESTING APPARATUS, INCLUDING MEANS FOR INDICATING THE TYPE OF TROUBLE
Filed Oct. 3, 1947
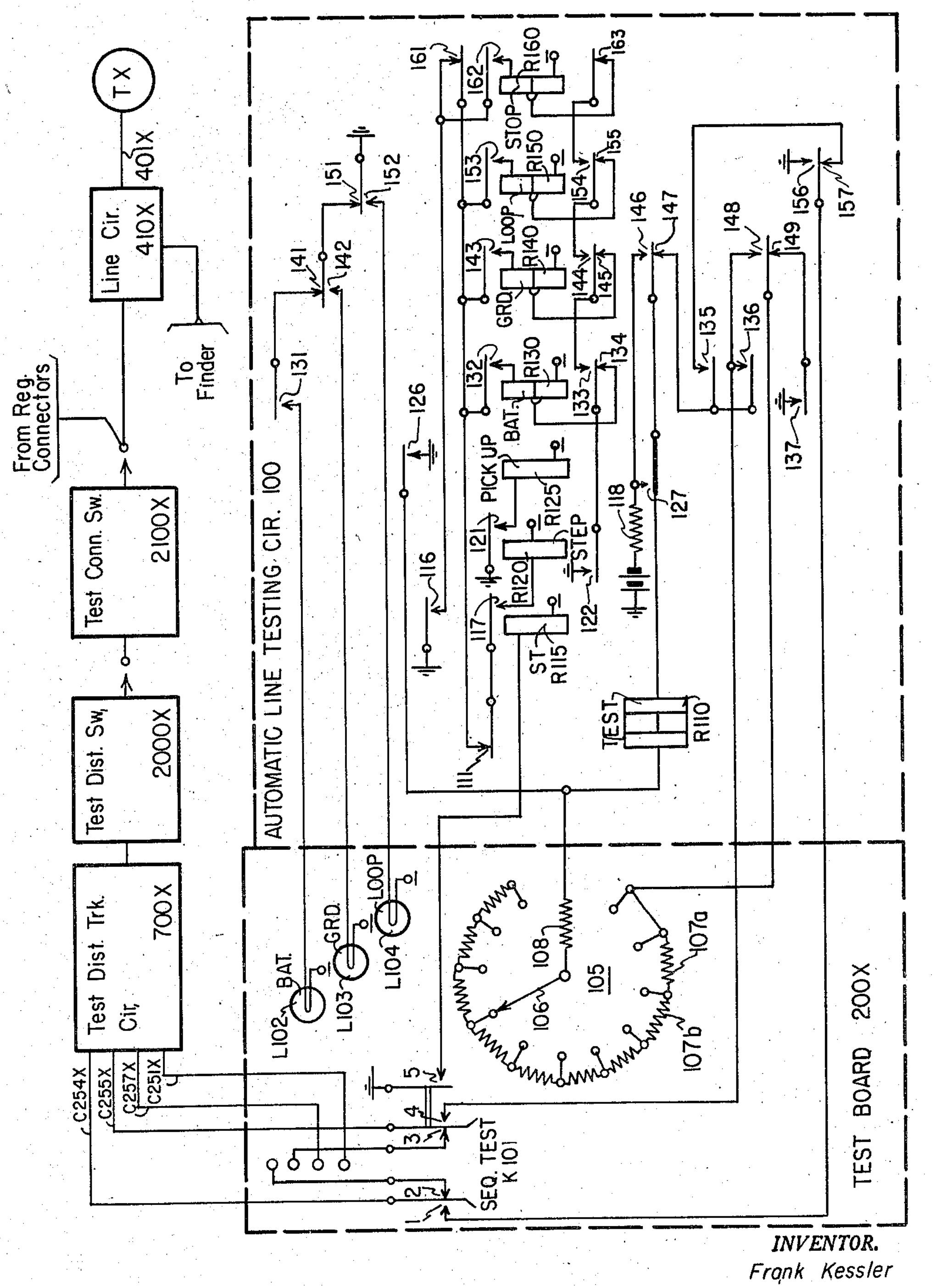
INVENTOR.
Frank Kessler
BY Smith, Olsen + Baird
Attorneys Patented May 1, 1951 2,550,820

UNITED STATES PATENT OFFICE 2,550,820

AUTOMATIC LINE TESTING APPARATUS, INCLUDING MEANS FOR INDICATING THE TYPE OF TROUBLE

Frank Kessler, Rochester, N. Y., assignor to Automatic Electric Laboratories, Inc., Chicago, Ill., a corporation of Delaware Application October 3, 1947, Serial No. 777,663

5 Claims. (Cl. 179—175.2)

The present invention relates to automatic line testing apparatus and more particularly to such apparatus that is especially adapted for use in conjunction with a test board incorporated in a switching testing telephone system of the character of that disclosed in the copending application of Frank Kessler, Serial No. 774,495, filed September 17, 1947.

In this switching testing telephone system, a test board of the manual dial and key controlled type is provided that has access via an automatic testing switch train to subscriber lines, whereby the operator at the test board may control the associated testing switch train to select any one of the subscriber lines to be tested. Thereafter the operator at the test board may perform a great number of individual key operations in order to cause the associated position testing equipment to perform a corresponding number of individual tests upon the connected subscriber line; whereby the different types of faults upon the connected subscriber line may be detected and measured.

While this testing facility is very flexible permitting the detection of each individual type of fault, as well as a precise measurement of the severity or intensity thereof, a number of key operations on the part of the operator at the test board are required and more time is consumed in performing a routine test than is desirable.

Accordingly, it is a general object of the present invention to provide automatic line testing apparatus that is especially adapted for use in conjunction with a test board of the character described, which apparatus is operative extremely fast to perform a routine test and to detect a line fault and to classify the type thereof, whereby it is necessary for the operator at the test board to perform the key controlled precision tests mentioned only in the event the automatic line testing apparatus has indicated the presence and type of a line fault on the connected subscriber line.

Another object of the invention is to provide automatic line testing apparatus of improved circuit connection and arrangement.

A further object of the invention is to provide automatic line testing apparatus that is capable of performing in sequence in a rapid and reliable manner, a number of tests for the more common types of line faults.

Further features of the invention pertain to the particular arrangement of the circuit elements of the system, whereby the above-outlined and additional operating features thereof are attained.

The invention, both as to its organization and method of operation, together with further objects and advantages thereof, will best be understood by reference to the following specification taken in connection with the accompanying drawing in which the single figure is a schematic diagram of a telephone system embodying the present invention and illustrating the general arrangement of the apparatus incorporated in the exchange thereof, as well as the details of an automatic line testing circuit provided therein.

Referring now more particularly to the drawing, the telephone system there illustrated comprises an exchange of the automatic type, including a number of subscriber substations, one of which is indicated at TX, the subscriber substation TX being provided with a subscriber line 401X extending thereto and having a line circuit 410X individually associated therewith. Also the exchange comprises automatic switching apparatus, not shown, including finders, selectors, and connectors that are utilized for the purpose of setting up connections to and from the subscriber substations therein.

Further, the exchange comprises a test board 200X and a test switch train including a test distributor trunk circuit 700X, a connected test distributor switch 2000X and a plurality of test connector switches, including the test connector switch 2100X having access to the group of subscriber lines, including the subscriber line 401X extending to the subscriber substation TX. Finally, the exchange comprises an automatic line testing circuit 100 provided with a relay group including a test relay R110, a start relay R115, a step relay R120, a pick-up relay R125, a battery relay R130, a ground relay R140, a loop relay R150, and a stop relay R160. Associated with and connected to the automatic line testing circuit 100 are a battery lamp L102, a ground lamp L103, and a loop lamp L104, as well as an adjustable resistor 105 and a sequence test key K101; all disposed at the test board 200X.

In the telephone system, the pieces of apparatus identified by the notation "X" correspond to the same elements, without the notation, disclosed in the telephone system of the previously mentioned Kessler application. Specifically, the test board 200X corresponds to the test board 200 disclosed in detail in Figs. 2 and 8 to 19, inclusive, of the Kessler application mentioned; the test distributor trunk circuit 700X corresponds to the test distributor trunk circuit 700 disclosed in detail in Fig. 7 of the Kessler application mentioned; the test distributor switch 2000X corresponds to the test distributor switch 2000 disclosed in detail in Fig. 20 of the Kessler application mentioned; and the test connector switch 2100X corresponds to the test connector switch 2100 disclosed in detail in Fig. 21 of the Kessler application mentioned.

A better understanding of the connection and arrangement of the apparatus incorporated in the telephone system will be facilitated from a consideration of the operation of the automatic line testing circuit 100 to perform sequence line tests upon the subscriber line 401X extending to the subscriber substation TX.

As disclosed in the Kessler application mentioned, the test board 200X comprises position testing equipment terminating the conductors C254X, C255X, C257X and C251X extending to the test distributor trunk circuit 700X; and in the present arrangement the line conductors C254X and C255X have been terminated on the blades of the sequence test key K101; whereby they are connected via the second and third contacts of the sequence test key K101, when the sequence test key K101 occupies its restored position, directly into the position testing equipment. Accordingly, the operator at the test board 200X may perform a key operation thereat in order to cause the condutcors C254X, C255X, C257X and C251X extending to the test distributor trunk circuit 700X to be seized; whereby the test distributor trunk circuit 700X is seized effecting seizure of the test distributor switch 2000X. The operator at the test board 200X then operates the dial in the associated position testing equipment in accordance with four predetermined digits comprising the directory number of the called subscriber substation TX. The test distributor switch 2000X responds to the first and second of the digits mentioned to select the corresponding test connector switch 2100X; whereby the idle or busy condition thereof is tested in the test distributor switch 2000X. Assuming that the test connector switch 2100X is idle at this time, the test distributor switch 2000X seizes it; whereby the test connector switch 2100X is rendered responsive to the third and fourth digits dialed at the test board 200X. More particularly, the test connector 2100X responds to the third and fourth digits mentioned to select the subscriber line 401X extending to the called subscriber substation TX; whereby the test connector switch 2100X tests the idle or busy condition thereof. Assuming that the subscriber substation TX is idle at this time, the test connector switch 2100X switches through completing a direct metallic test circuit between the line conductors of the subscriber line 401X extending to the called subscriber substation TX and the line conductors C254X and C255X terminated in the position testing equipment at the test board 200X via the test distributor trunk circuit 700X, the test distributor switch 2000X and the test connector switch 2100X. At this time the operator at the test board 200X may selectively perform any one of a great number of individual key operations in order to cause the associated position testing equipment to test the subscriber line 401X for corresponding faults and circuit conditions thereon. Specifically, at this time, by performing the appropriate individual key operations, the operator at the test board 200X may cause the associated position testing equipment to test the subscriber line 401X extending to the called subscriber substation TX for insulation faults, including insulation faults to battery potential thereon, insulation faults to ground potential thereon and insulation loop faults between the line conductors thereof.

While the position testing equipment associated with the test board 200X is extremely flexible, permitting a great number of individual tests with respect to the subscriber line 401X, as well as with respect to the individual line conductors thereof, the key operations required are correspondingly rather numerous and somewhat time consuming. Accordingly, the operator at the test board 200X after extending a test connection from the associated position testing equipment to the subscriber line 401X, as noted above, may wish to perform automatically a number of insulation tests thereon without carrying out the individual key operations previously noted. In order to accomplish this end, the operator at the test board 200X after setting up the test connection between the associated position testing equipment and the subscriber line 401X, as noted above, merely operates the non-locking sequence test key K101; whereby there is interrupted, at the second and third contacts thereof, the normal connection between the associated position testing equipment and the line conductors C254X and C255X extending directly via metallic paths to the line conductors of the subscriber line 401X. Also at the first and fourth contacts of the sequence test key K101, the line conductors C254X and C255X are directly connected to the automatic line testing circuit 100. Finally, at the fifth contacts of the sequence test key K101 there is completed a circuit for operating the start relay R115 in the automatic line testing circuit 100. Upon operating the start relay R115 initiates a cycle of operation of the automatic line testing circuit 100; whereby sequential insulation tests are performed therein upon the subscriber line 401X for faults to battery potential thereon, faults to ground potential thereon and loop faults across the line conductors thereof.

More particularly, upon operating the start relay R115 completes, at the contacts 116 and 117, a circuit, including the contacts 161 and 111, for operating the step relay R120. Upon operating the step relay R120 completes, at the contacts 121, a circuit for operating the pick-up relay R125; and completes, at the contacts 122, a circuit, including the contacts 134, for energizing the lower winding of the battery relay R130 in order to cause the latter relay to operate through its first step, the latter relay being of the two-step type. When the battery relay R130 operates through its first step, it completes, at the contacts 132, a path, including the contacts 116, 161, 134 and 122, for short-circuiting the upper winding thereof, thereby positively to prevent the latter relay from operating through its second step at this time. Upon operating the pick-up relay R125 completes, at the contacts 126 and 127 a pick-up circuit, including the resistor 118 for operating the test relay R110. Upon operating the test relay R110 interrupts, at the contacts 111, the circuit for retaining operated the step relay R120. Upon restoring the step relay R120 interrupts, at the contacts 122, the previously traced path for short-circuiting the upper winding of the battery relay R130; whereby a circuit, including the contacts 116, 161, and 132 is completed for energizing in series the upper and lower windings of the battery relay R130 in order to cause the latter relay to operate through its second step. When the battery relay R130 operates through its second step, it interrupts, at the contacts 134, a further point in the circuit for energizing the lower winding thereof; prepares, at the contacts 133, a point in a circuit traced hereinafter for energizing the lower winding of the ground relay R140; and completes, at the contacts 131, a circuit, including the contacts 151 and 141, for illuminating the battery lamp L102 at the test board 200X in order to indicate to the operator thereat that an insulation fault to battery potential test is being performed by the automatic line testing circuit 100 upon the connected subscriber line 401X.

Also the battery relay R130 completes, at the contacts 135 and 136, a bridge connection, including the contacts 157 and the first and fourth contacts of the sequence test key K101, to the line conductors C254X and C255X. Also the battery relay R130 completes, at the contacts 137, a test path, including the contacts 149, for applying ground potential to the bank of the adjustable resistor 105 and consequently through the individual resistors 107*a*, 107*b*, etc., to the rotatable arm 106 and thence through the resistor 108 to the left-hand terminal of the winding of the test relay R110; which test path is extended through the windings of the test relay R110 via the contacts 147 to the contacts 135 and 136 included in the above traced bridge connection extending to the line conductors C254X and C255X and consequently to the line conductors of the subscriber line 401X. Accordingly, at this time, in the event an insulation fault to battery potential is present upon either of the line conductors of the subscriber line 401X, the presence of battery potential thereon completes the above traced circuit via the bridge connection and the test path for energizing the windings of the test relay R110. Of course, in the event no insulation fault to battery potential is present upon either of the line conductors of the subscriber line 401X the above traced circuit for energizing the windings of the test relay R110 is not completed.

Also upon restoring the step relay R120 interrupts, at the contacts 121, the circuit for retaining operated the pick-up relay R125. Upon restoring the pick-up relay R125 interrupts, at the contacts 126 and 127, the pick-up circuit for energizing the winding of the test relay R110. Accordingly, at this time the test relay R110 is retained in its operated position in the event an insulation fault to battery potential appears upon the subscriber line 401X; and is restored in the event no insulation fault to battery potential appears upon the subscriber line 401X as explained above. First assuming that an insulation fault to battery potential appears upon the subscriber line 401X, the test relay R110 is retained in its operated position preventing further operation of the step relay R120; whereby the operated battery relay R130 retains illuminated the battery lamp L102 at the test board 200X. Accordingly, further operation of the automatic line testing circuit 100 is arrested and the illuminated battery lamp L102 indicates to the operator at the test board 200X that the automatic line testing circuit 100 has tested the subscriber line 401X as having an insulation fault to battery potential thereon. At this time the operator at the test board 200X may restore the sequence test key K101, thereby to release the automatic line testing circuit 100 as explained more fully hereinafter and to cause the line conductors C254X and C255X again to be connected at the second and third contacts of the sequence test key K101 to the associated position testing equipment; whereby the associated position testing equipment may be selectively operated in order to determine in greater detail the characteristic of the insulation fault to battery potential appearing upon the subscriber line 401X.

Now assuming that no insulation fault to battery potential appears upon the subscriber line 401X, the test relay R110 is restored incident to restoration of the pick-up relay R125; and recompletes, at the contacts 111, the circuit for operating the step relay R120; whereby the latter relay upon operating, completes, at the contacts 121, the circuit for operating the pick-up relay R125. Also the step relay R120 completes, at the contacts 122, the previously mentioned circuit, including the contacts 133 and 145, for energizing the lower winding of the ground relay R140 in order to cause the latter relay to operate through its first step, it being of the two-step type. When the ground relay R140 operates, through its first step, it completes, at the contacts 143, a path, including the contacts 116, 161, 145, 133 and 122, for short-circuiting the upper winding thereof, thereby positively to prevent the latter relay from operating through its second step at this time. Upon operating, the pick-up relay R125 completes, at the contacts 126 and 127, the pick-up circuit for operating the test relay R110. Upon operating the test relay R110 interrupts, at the contacts 111, the circuit for retaining operated the step relay R120. Upon restoring, the step relay R120 interrupts, at the contacts 122, the previously traced path for short-circuiting the upper winding of the ground relay R140; whereby a circuit, including the contacts 116, 161 and 143, is completed for energizing in series the upper and lower windings of the ground relay R140 in order to cause the latter relay to operate through its second step. When the ground relay R140 operates through its second step, it interrupts, at the contacts 145, a further point in the circuit for energizing the lower winding thereof; prepares, at the contacts 144, a point in a circuit traced hereinafter for energizing the lower winding of the loop relay R150; interrupts, at the contacts 141, the circuit for illuminating the battery lamp L102 at the test board 200X; and completes, at the contacts 142, a circuit, including the contacts 151, for illuminating the ground lamp L103 at the test board 200X in order to indicate to the operator thereat that an insulation fault to ground potential is being performed by the automatic line testing circuit 100 upon the connected subscriber line 401X.

Also the ground relay R140 interrupts, at the contacts 147, the previously traced connection between the bridge connection and the right-hand terminal of the test relay R110; and completes, at the contacts 146, a test path between the resistor 118 and the right-hand terminal of the test relay R110, the resistor 118 being connected to battery potential as previously noted. Further the ground relay R140 interrupts, at the contacts 149, the previously traced path for applying ground potential to the bank of the adjustable resistor 105; and completes, at the contacts 148, a connection between the bridge connection and the bank of the adjustable resistor 105. Accordingly, at this time battery potential is applied via the resistor 118, the contacts 146, the windings of the test relay R110, the resistor 108, the rotatable arm 106 of the adjustable resistor 105 and through the individual resistors 107*a*, 107b, etc., and the contacts 148 to the contacts 136 and 135 included in the previously traced bridge connection. Hence, the battery potential mentioned is extended via contacts 157 and the first and fourth contacts of the sequence test key K101 to the line conductors C254X and C255X and consequently to the line conductors of the subscriber line 401X. Accordingly, at this time, in the event an insulation fault to ground potential is present upon either of the line conductors of the subscriber line 401X, the presence of ground potential thereon completes the above traced circuit via the bridge connection and the test path for energizing the windings of the test relay R110. Of course, in the event no insulation fault to ground potential is present upon either of the line conductors of the subscriber line 401X, the above traced circuit for energizing the windings of the test relay R110 is not completed.

Also upon restoring the step relay R120 interrupts, at the contacts 121, the circuit for retaining operated the pick-up relay R125. Upon restoring the pick-up relay R125 interrupts, at the contacts 126 and 127, the pick-up circuit for energizing the winding of the test relay R110. Accordingly, at this time the test relay R110 is retained in its operated position in the event an insulation fault to ground potential appears upon the subscriber line 401X; and is restored in the event no insulation fault to ground potential appears upon the subscriber line 401X as explained above. First assuming that an insulation fault to ground potential apears upon the subscriber line 401X, the test relay R110 is retained in its operated position preventing further operation of the step relay R120; whereby the operated ground relay R140 retains illuminated the ground lamp L103 at the test board 200X. Accordingly, further operation of the automatic line testing circuit 100 is arrested and the illuminated ground lamp L103 indicates to the operator at the test board 200X that the automatic line testing circuit 100 has tested the subscriber line 401X as having an insulation fault to ground potential thereon. At this time the operator at the test board 200X may restore the sequence test key K101, thereby to release the automatic line testing circuit 100 as explained more fully hereinafter and to cause the line conductors C254X and C255X again to be connected at the second and third contacts of the sequence test key K101 to the associated position testing equipment; whereby the associated positon testing equipment may be selectively operated in order to determine in greater detail the characteristic of the insulation fault to ground potential appearing upon the subscriber line 401X.

Now assuming that no insulation fault to ground appears upon the subscriber line 401X, the test relay R110 is restored incident to restoration of the pick-up relay R125; and recompletes, at the contacts 111, the circuit for operating the step relay R120; whereby the latter relay upon operating completes, at the contacts 121, the circuit for operating the pick-up relay R125. Also the step relay R120 completes, at the contacts 122, the previously mentioned circuit, including the contacts 133, 144 and 155, for energizing the lower winding of the loop relay R150 in order to cause the latter relay to operate through its first step, it being of the two-step type. When the loop relay R150 operates through its first step, it completes, at the contacts 153, a path, including the contacts 116, 161, 155, 144, 133 and 122, for short-circuiting the upper winding thereof, thereby positively to prevent the latter relay from operating through its second step at this time. Upon operating the pick-up relay R125 completes, at the contacts 126 and 127, the pick-up circuit for operating the test relay R110. Upon operating the test relay R110 interrupts, at the contacts 111, the circuit for retaining operated the step relay R120. Upon restoring the step relay R120 interrupts, at the contacts 122, the previously traced path for short-circuiting the upper winding of the loop relay R150; whereby a circuit, including the contacts 116, 161 and 153, is completed for energizing in series the upper and lower windings of the loop relay R150 in order to cause the latter relay to operate through its second step. When the loop relay R150 operates through its second step, it interrupts, at the contacts 155, a further point in the circuit for energizing the lower winding thereof; prepares, at the contacts 154, a point in a circuit traced hereinafter for energizing the lower winding of the stop relay R160; interrupts, at the contacts 151, the circuit for illuminating the ground lamp L103 at the test board 200X; and completes, at the contacts 152, a circuit for illuminating the loop lamp L104 at the test board 200X in order to indicate to the operator thereat that an insulation loop fault test is being performed by the automatic line testing circuit 100 upon the connected subscriber line 401X.

Also the loop relay R150 interrupts, at the contacts 157, the previously traced bridge connection between the line conductors C254X and C255X; and completes, at the contacts 156, a direct path, including the first contacts of the sequence test key K101, for applying ground potential to the positive line conductor C254X. Also at this time, the previously traced test path, including the contacts 146, is completed for applying battery potential by way of the resistor 118 to the right-hand winding of the test relay R110; which battery potential is extended via the resistor 108, the rotatable arm 106 of the adjustable resistor 105 and through the individual resistors 107a, 107b, etc., the contacts 148 and the fourth contacts of the sequence test key K101 to the negative line conductor C255X. Accordingly, at this time, in the event an insulation loop fault is present between the line conductors of the subscriber line 401X, there is completed the above traced circuit via the test path for energizing the windings of the test relay R110. Of course, in the event no insulation loop fault is present between the line conductors of the subscriber line 401X, the above traced circuit for energizing the windings of the test relay R110 is not completed.

Also upon restoring the step relay R120 interrupts, at the contacts 121, the circuit for retaining operated the pick-up relay R125. Upon restoring the pick-up relay R125 interrupts, at the contacts 126 and 127, the pick-up circuit for energizing the winding of the test relay R110. Accordingly, at this time, the test relay R110 is retained in its operated position in the event an insulation loop fault appears upon the subscriber line 401X; and is restored in the event no insulation loop fault appears upon the subscriber line 401X as explained above. First assuming that an insulation loop fault appears upon the subscriber line 401X, the test relay R110 is retained in its operated position preventing further operation of the step relay R120; whereby the operated loop relay R150 retains illuminated the loop lamp L104 at the test board 200X. Accordingly, further operation of the automatic line testing circuit 100 is arrested and the illuminated loop lamp L104 indicates to the operator at the test board 200X that the automatic line testing circuit 100 has tested the subscriber line 401X as having an insulation loop fault thereon. At this time the opeartor at the test board 200X may restore the sequence test key K101, thereby to release the automatic line testing circuit 100 as explained more fully hereinafter and to cause the line conductors C254X and C255X again to be connected at the second and third contacts of the sequence test key K101 to the associated position testing equipment; whereby the associated position testing equipment may be selectively operated in order to determine in greater detail the characteristic of the insulation loop fault appearing upon the subscriber line 401X.

Now assuming that no insulation loop fault appears upon the subscriber line 401X, the test relay R110 is restored incident to restoration of the pick-up relay R125; and recompletes, at the contacts 111, the circuit for operating the step relay R120; whereby the latter relay upon operating completes, at the contacts 121, the circuit for operating the pick-up relay R125. Also the step relay R120 completes, at the contacts 122, the previously mentioned circuit, including the contacts 133, 144, 154 and 163, for energizing the lower winding of the stop relay R160 in order to cause the latter relay to operate through its first step, it being of the two-step type. When the stop relay R160 operates through its first step, it completes, at the contacts 162, a path, including the contacts 116, 163, 154, 144, 133 and 122, for short-circuiting the upper winding thereof, thereby positively to prevent the latter relay from operating through its second step at this time. Upon operating the pick-up relay R125 completes, at the contacts 126 and 127 the pick-up circuit for operating the test relay R110. Upon operating the test relay R110 interrupts, at the contacts 111, the circuit for retaining operated the step relay R120. Upon restoring the step relay R120 interrupts, at the contacts 122, the previously traced path for short-circuiting the upper winding of the stop relay R160; whereby there is completed, a circuit, including the contacts 116 and 162, for energizing in series the upper and lower windings of the stop relay R160 causing the latter relay to operate through its second step. When the stop relay R160 operates through its second step, it interrupts, at the contacts 161, the multiple holding circuits for energizing in series the upper and lower windings of the battery relay R130, the ground relay R140 and the loop relay R150 in order to cause the latter relays to restore. Upon restoring the loop relay R150 interrupts, at the contacts 152, the circuit for illuminating the loop lamp L104 at the test board 200X. Also the operated stop relay R160 prevents further operation of the step relay R120 and the pick-up relay R125; whereby the test relay R110 is retained in its restored position together with the battery relay R130, the ground relay R140 and the loop relay R150.

In view of the foregoing, it will be understood that in the event the automatic line testing circuit 100 tests the subscriber line 401X as having thereon no insulation fault to battery potential, no insulation fault to ground potential and no insulation loop fault, the stop relay R160 is operated as described above a brief time interval after the sequence test key K101 is operated. Of course, in the meantime, the three individual tests upon the subscriber line 401X are performed by the automatic line testing circuit 100. Accordingly, the battery lamp L102, the ground lamp L103, and the loop lamp L104 are sequentially flashed momentarily and then extinguished indicating that the automatic line testing circuit 100 has tested the subscriber line 401X and has found thereon none of the insulation faults above described. Of course, in the event the automatic line testing circuit 100 tests the subscriber line 401X as having one of the insulation faults thereof previously mentioned, the corresponding lamp L102, L103 or L104 at the test board 200X is illuminated as previously explained, to identify the particular insulation fault that has been found by the automatic line testing circuit 100 to be upon the subscriber line 401X all as previously explained.

Accordingly, when the operator at the test board 200X operates the sequential test key K101, the automatic line testing circuit 100 is operated to perform the insulation fault tests above described and to indicate either no insulation fault on the subscriber line 401X or the particular insulation fault found thereon as described above. The operator at the toll board 200X then restores the sequence test key K101 in order to interrupt, at the first and fourth contacts thereof, the connection between the line conductors C254X and C255X and the automatic line testing circuit 100; and to complete, at the second and third contacts of the sequence test key K101, the connection between the line conductors C254X and C255X and the associated position testing equipment. Also when the sequence test key K101 is restored, there is interrupted, at the fifth contacts thereof, the circuit for retaining operated the start relay R115 in the automatic line testing circuit 100. Upon restoring the start relay R115 interrupts, at the contacts 116, the holding circuit for energizing in series the upper and lower windings of any operated one of the relays R130, R140, R150 or R160 at this time; whereby the automatic line testing circuit 100 is completely released and available for further use.

In conjunction with the operation of the automatic line testing circuit 100 to test the subscriber line 401X for the various insulation faults thereon, previously described, it is noted that in each case, the test circuit for retaining operated the test relay R110 in the automatic line testing circuit 100 includes the adjustable resistor 105 disposed at the test board 200X; whereby the operator at the test board 200X may selectively set the rotatable arm 106 of the adjustable resistor 105 in order to include one or more of the individual ressitors 107*a*, 107*b*, etc., in the test circuit or to exclude all of the individual resistors 107*a*, etc., therefrom. This arrangement permits the operator at the test board 200X to establish the limits of the insulation fault tests performed by the automatic line testing circuit 100 as it will be appreciated that the test relay R110 will be retained in its operated position to register the presence of a given insulation fault depending both upon the severity or intensity of the given insulation fault and the adjustment of the adjustable resistor 105. In other words, the test relay R110 is retained in its operated position to register a given insulaton fault only in the event the severity or intensity thereof is greater than that for which the adjustable resistor 105 is set by the operator at the test board 200X. This arrangement is very advantageous as it permits the operator at the test board 200X to set readily the flexibility of operation of the automatic line testing circuit 100 to register insulation faults.

In view of the foregoing it is apparent that there has been provided an automatic line testing circuit that may be employed in conjunction with a manual test board in order to perform rapidly and in sequence a plurality of line insulation tests and to render to the operator at the test board an appropriate signal indicating the results of the line insulation tests that are performed thereby.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including a test operator position, subscriber lines, a plurality of signals disposed at said test operator position and respectively corresponding to the types of faults that may occur upon a subscriber line, means controllable from said test operator position for setting up a test connection therefrom to any one of said subscriber lines, automatic testing apparatus, a start control, and additional means controllable from said test operator position for transferring said test connection to said one subscriber line from said test operator position to said apparatus and for transmitting said start control to said apparatus; said apparatus comprising cyclic mechanism operatively sequentially through a plurality of positions, means responsive to said start control for initiating operation of said mechanism, a plurality of test circuits respectively corresponding to the positions of said mechanism and respectively corresponding to the types of faults that may occur upon a subscriber line, a test device, means responsive to operation of said mechanism into its different positions for setting up corresponding ones of said test circuits between said test device and said test connection and for selecting corresponding ones of said signals, said test device being operated in response to the completion of any one of said test circuits so that operation of said test device when said mechanism occupies a given one of its positions is indicative of the corresponding type of fault upon said one subscriber line, and means responsive to operation of said test device for arresting operation of said mechanism and for operating the selected one of said signals.

2. In a telephone system including a test operator position, subscriber lines, a plurality of signals disposed at said test operator position and respectively corresponding to the types of faults that may occur upon a subscriber line, an adjustable selector disposed at said test operator position, means controllable from said test operator position for setting up a test connection therefrom to any one of said subscriber lines, automatic testing apparatus, a start control, and additional means controllable from said test operator position for transfering said test connection to said one subscriber line from said test operator position via said selector to said apparatus and for transmitting said start control to said apparatus; said apparatus comprising cyclic mechanism operatively sequentially through a plurality of positions, means responsive to said start control for initiating operation of said mechanism, a plurality of test circuits respectively corresponding to the positions of said mechanism and respectively corresponding to the types of faults that may occur upon a subscriber line, a test device, means responsive to operation of said mechanism into its different positions for setting up corresponding ones of said test circuits between said test device and said test connection and for selecting corresponding ones of said signals, said test device being operated in response to the completion of any one of said test circuits so that operation of said test device when said mechanism occupies a given one of its positions is indicative of the corresponding type of fault upon said one subscriber line, said selector being adjustable selectively to set the sensitivity of operation of said test device to a fault upon a subscriber line to which said test connection is extended, and means responsive to operation of said test device for arresting operation of said mechanism and for operating the selected one of said signals.

3. In a telephone system including a test operator position, subscriber lines, a plurality of signals disposed at said test operator position and respectively corresponding to the types of faults that may occur upon a subscriber line, means controllable from said test operator position for setting up a test connection therefrom to any one of said subscriber lines, automatic testing apparatus, a start control, and additional means controllable from said test operator position for transferring said test connection to said one subscriber line from said test operator position to said apparatus and for transmitting said start control to said apparatus; said apparatus comprising cyclic mechanism operatively sequentially through a plurality of positions, means responsive to said start control for initiating operation of said mechanism, a plurality of test circuits respectively corresponding to the positions of said mechanism and respectively corresponding to the types of faults that may occur upon a subscriber line, a test relay, a pick-up circuit for operating said test relay, means responsive to said start control for completing said pick-up circuit, means responsive to operation of said test relay for operating said mechanism into a first of its positions, means responsive for operation of said mechanism into its first position for setting up a first of said test circuits between said test relay and said test connection and for operating the corresponding first of said signals and for interrupting said pick-up circuit so that said test relay is retained operated via said first test circuit only in the event a corresponding first type of fault is present upon said one subscriber line, means responsive to restoration of said test relay for recompleting said pick-up circuit, means responsive to reoperation of said test relay for operating said mechanism into a second of its positions, means responsive to operation of said mechanism into its second position for setting up a second of said test circuits between said test relay and said test connection and for restoring said first signal and for operating the corresponding second of said signals and for interrupting said pick-up circuit so that said test relay is retained operated via said second test circuit only in the event a corresponding second type of fault is present upon said one subscriber line, means responsive to restoration of said test relay for recompleting said pick-up circuit, means responsive to reoperation of said test relay for operating said mechanism into a third of its positions, and means responsive to operation of said mechanism into its third position for restoring said second signal and for interrupting said pick-up circuit.

4. In a telephone system including a test operator position, subscriber lines, a plurality of signals disposed at said test operator position and respectively corresponding to the types of faults that may occur upon a subscriber line, means controllable from said test operator position for setting up a test connection therefrom to any one of said subscriber lines, automatic testing apparatus, a start control, and additional means controllable from said test operator position for transferring said test connection to said one subscriber line from said test operator position to said apparatus and for transmitting said start control to said apparatus; said apparatus comprising cyclic mechanism operatively sequentially through a plurality of positions, means responsive to said start control for initiating operation of said mechanism, a plurality of test circuits respectively corresponding to the positions of said mechanism and respectively corresponding to the types of faults that may occur upon a subscriber line, a test device, means responsive to operation of said mechanism into its different positions for setting up corresponding ones of said test circuits between said test device and said test connection, said test device being operated in response to the completion of any one of said test circuits so that operation of said test device when said mechanism occupies a given one of its positions is indicative of the corresponding type of fault upon said one subscriber line, means responsive to operation of said test device for arresting operation of said mechanism, and means for operating and for restoring sequentially said signals in response to operation of said mechanism through its different positions in order to indicate that the corresponding tests have been made and that the corresponding faults are not present upon said one subscriber line, one of said signals corresponding to a given fault being retained operated in the event operation of said mechanism is arrested in a corresponding one of its positions.

5. In a telephone system including a test operator position, subscriber lines, each of said subscriber lines including a pair of line conductors, a plurality of signals disposed at said test operator position and respectively corresponding to the types of faults that may occur upon a subscriber line, means controllable from said test operator position for setting up a test connection therefrom to any one of said subscriber lines, automatic testing apparatus, a start control, and additional means controllable from said test operator position for transferring said test connection to said one subscriber line from said test operator position to said apparatus and for transmitting said start control to said apparatus; said apparatus comprising cyclic mechanism operatively sequentially through a plurality of positions, means responsive to said start control for initiating operation of said mechanism, a test circuit, a test device, battery and ground potentials, means responsive to operation of said mechanism into a first of its positions for bridging together via said test connection the line conductors of said one subscriber line and for setting up said test circuit thereto via said test device from said battery potential so that said test device is operated in the event of a ground fault on either line conductor of said one subscriber line, means responsive to operation of said mechanism into a second of its positions for bridging together via said test connection the line conductors of said one subscriber line and for setting up said test circuit thereto via said test device from said ground potential so that said test device is operated in the event of a battery fault on either line conductor of said one subscriber line, means responsive to operation of said mechanism into a third of its positions for setting up said test circuit to the line conductors of said one subscriber line via said test device respectively from said ground potential and said battery potential so that said test device is operated in the event of a loop fault between the line conductors of said one subscriber line, additional means responsive to operation of said mechanism into its different positions for selecting corresponding ones of said signals, and means responsive to operation of said test relay for arresting operation of said mechanism and for operating the selected one of said signals.

FRANK KESSLER.

REFERENCES CITED

The following references are of record in the file of this patent:

UNITED STATES PATENTS

| Number | Name | Date |
|---|---|---|
| 1,220,607 | Clausen | Mar. 27, 1917 |
| 1,340,935 | Goodrum | May 25, 1920 |
| 1,855,852 | Freesland | Apr. 26, 1932 |
| 1,881,544 | Hartley | Oct. 11, 1932 |
| 2,328,750 | Smith et al. | Sept. 7, 1943 |
| 2,329,491 | Sulzer | Sept. 14, 1943 |